United States Patent [19]
Danielson

[11] Patent Number: 6,164,545
[45] Date of Patent: Dec. 26, 2000

[54] CODE READER FOR CONVERTING TWO DIMENSIONAL INFORMATION INTO A ONE DIMENSIONAL FORMAT

[75] Inventor: Arvin D. Danielson, Solon, Iowa

[73] Assignee: Intermec IP Corp., Woodland Hills, Calif.

[21] Appl. No.: 08/704,427

[22] Filed: Aug. 19, 1996

Related U.S. Application Data

[63] Continuation of application No. 08/299,008, Aug. 30, 1994, abandoned, which is a continuation-in-part of application No. 08/284,883, Jul. 28, 1994, Pat. No. 5,414,251, which is a continuation of application No. 08/277,132, Jul. 19, 1994, abandoned, which is a continuation of application No. 07/919,488, Jul. 27, 1992, abandoned, which is a continuation-in-part of application No. 07/849,771, Mar. 12, 1992, abandoned, and a continuation-in-part of application No. 07/889,705, May 26, 1992, abandoned, said application No. 08/299,008, Aug. 30, 1994, abandoned, is a continuation-in-part of application No. 08/241,866, May 11, 1994, abandoned, which is a continuation-in-part of application No. 08/170,120, Dec. 17, 1993, abandoned, which is a continuation-in-part of application No. 08/067,384, May 25, 1993, abandoned, which is a continuation-in-part of application No. 08/060,404, May 11, 1993, abandoned.

[51] Int. Cl.[7] .................................................. G06K 7/10
[52] U.S. Cl. ............................................. 235/472; 235/462
[58] Field of Search .................................. 235/472, 467, 235/462

[56] References Cited

U.S. PATENT DOCUMENTS

| 5,347,113 | 9/1994 | Reddersen | 235/462 |
| 5,378,882 | 1/1995 | Gong | 235/472 |
| 5,406,061 | 4/1995 | Knight | 235/462 |
| 5,414,250 | 5/1995 | Swartz | 235/462 |

*Primary Examiner*—Donald T. Hajec
*Assistant Examiner*—Karl Frech
*Attorney, Agent, or Firm*—Akin, Gump, Strauss, Hauer & Feld, LLP

[57] ABSTRACT

A scanner for reading two-dimensional optical information sets is described which includes a housing for supporting a photosensitive array associated with an optical string adapted to focus optical information on the array. Also provided are array and optical string controls for controlling the array and optical string such that the output of selected images on the array are processed via pattern recognition techniques. Images recognized to contain decodable optical information are displayed and highlighted by a display. In addition, the scanner provides autodetect circuitry for determining the type of terminal to which it is attached and automatically converts the two-dimensional code information into an appropriate one dimensional format, as needed, for communication to an attached terminal.

17 Claims, 9 Drawing Sheets

CODE READER FOR CONVERTING TWO DIMENSIONAL INFORMATION INTO A ONE DIMENSIONAL FORMAT

CROSS-REFERENCE TO RELATED APPLICATIONS

The present application is a continuation of U.S. Application Ser. No. 08/299/008, filed Aug. 30, 1994, by Arvin D. Danielson now abandoned.

The present application is a continuation-in-part of U.S. application Ser. No. 08/284,883 filed Jul. 28, 1994 now U.S. Pat. No. 5,414,251, which is a continuation of U.S. application Ser. No. 08/277,132 filed Jul. 19, 1994 by Dennis A. Durbin now abandoned, which is itself a continuation of U.S. application Ser. No. 07/919,488, filed Jul. 27, 1992 by Dennis A. Durbin now abandoned, which is a continuation-in-part of (i) U.S. application Ser. No. 07/849,771, filed Mar. 12, 1992 now abandoned, and (ii) U.S. application Ser. No. 07/889,705, filed May 26, 1992 now abandoned.

This application is also a continuation-in-part of U.S. application Ser. No. 08/241,866, filed May 11, 1994 by Vadim Laser now abandoned, which is itself a continuation-in-part of U.S. application Ser. No. 08/170,120 now abandoned, filed Dec. 17, 1993, which is continuation-in-part of U.S. application Ser. No. 08/067,384, filed May 25, 1993 now abandoned, which in turn is a continuation-in-part of U.S. application Ser. No. 08/060,404, filed May 11, 1993 now abandoned.

INCORPORATION BY REFERENCE

Applicant hereby incorporates by reference the following patent applications in their entirety:

(1) U.S. application Ser. No. 08/284,883 filed Jul. 28, 1994.

(2) U.S. application Ser. No. 08/277,132 filed Jul. 19, 1994.

(3) U.S. application Ser. No. 07/919,488, filed Jul. 27, 1992.

(4) U.S. application Ser. No. 07/849,771, filed Mar. 12, 1992.

(5) U.S. application Ser. No. 07/889,705, filed May 26, 1992.

(6) U.S. application Ser. No. 08/241,866, filed May 11, 1994.

(7) U.S. application Ser. No. 08/170,120, filed Dec. 17, 1993.

(8) U.S. application Ser. No. 08/067,384, filed May 25, 1993.

(9) U.S. application Ser. No. 08/060,404, filed May 11, 1993.

BACKGROUND OF THE INVENTION

1. Technical Field

The present invention is directed to optical information readers and more particularly to readers which decode two-dimensional optical information.

2. Description of the Prior Art

Conventional bar code symbols have small data storage capacities. This reduces the utility of conventional bar code scanner and reader systems. For example, the 11 digit Uniform Pricing Code found on most supermarket items acts as an identifying number which may be utilized to access information in a database. Code readers and associated database terminals have been developed to read and process such codes.

In particular, conventional code readers are used to read and pre-process one-dimensional codes. Thereafter, the code readers send the resultant pre-processed code information to associated conventional terminals for further processing. Some conventional code readers, such as wand readers, send undecoded signals representing the one-dimensional code information to a first type of associated terminal for decoding. Other conventional code readers, such as laser scanning, LED or flash type one-dimensional code readers, send decoded code information to a second type of associated terminal that recognizes the information as being decoded. Because of the availability of such conventional one-dimensional bar code readers, conventional terminals of one type or the other have been built and installed in great numbers throughout the retail sales and inventory environments.

More recently, two-dimensional bar code symbols or "portable data files" and corresponding two-dimensional code readers have been developed. In fact, several two-dimensional coding standards have been proposed such as Code 49, 16K, Identicode MLC-2D, and Code PDF417, for example. Two-dimensional codes are capable of storing much more information than a one-dimensional code. For example, a two-dimensional code may contain such information as price, name of product, manufacturer, weight, expiration date, inventory data, shipping information, and the like, while a one-dimensional code may only contain an ASCII string which must be cross-referenced into a database on a terminal to extract such information. However, there are very few terminals available which can receive and further process two-dimensional bar code information. Thus, if a retailer, for example, decides to upgrade to using two-dimensional code readers, the retailer is forced to also purchase a two-dimensional code processing terminal and throw out the currently used one-dimensional code processing terminal.

3. Objects of the Invention

Therefore, it is a principal object of the present invention to provide a two-dimensional code reader which can be used with any type of terminal.

Another object of the present invention is to provide a code reader which can be programmed for use with any type of terminal.

Another object of the present invention is to provide a code reader which automatically identifies the type of terminal attached thereto and automatically configures itself to conform its output to that which the terminal expects.

Other objects and advantages of the invention will become apparent to those skilled in the art upon reading the following specification and claims.

SUMMARY OF THE INVENTION

A two-dimensional code reader sytem converts two-dimensional code information into a one-dimensional format usable by an attached terminal. Specifically, a code reader unit reads and decodes information from a two-dimensional code. The reader unit contains autodetection circuitry which detects and identifies a terminal which is communicatively coupled to the reader unit. The reader unit also cotains communication control circuitry which, in response to indications from the autodetection circuitry, converts the two-dimensional information into a one-dimensional format usable by the coupled terminal.

DESCRIPTION OF THE PREFERRED EXEMPLARY EMBODIMENTS

Exemplary two-dimensional bar code readers are illustrated in two embodiments as illustrated in FIGS. 1 through 7. Specifically, FIGS. 1, 4, 6, and 7 illustrate one type of two-dimensional bar code reader, while FIGS. 1, 5, 6, and 7 represent another. Both embodiments teach the construction and use of readers capable of decoding "portable data files."

Each exemplary embodiment utilizes image capture means, pattern recognition means, and a real time display for assisting a user in aiming, recognizing, confirming decodability, and decoding two-dimensional bar code symbols. The embodiments differ primarily in the particular construction and operation of their image capture means. A further image capture means is disclosed in U.S. application Ser. No. 08/241,866, filed May 11, 1994, which is incorporated herein by reference in its entirety.

Figure 5:
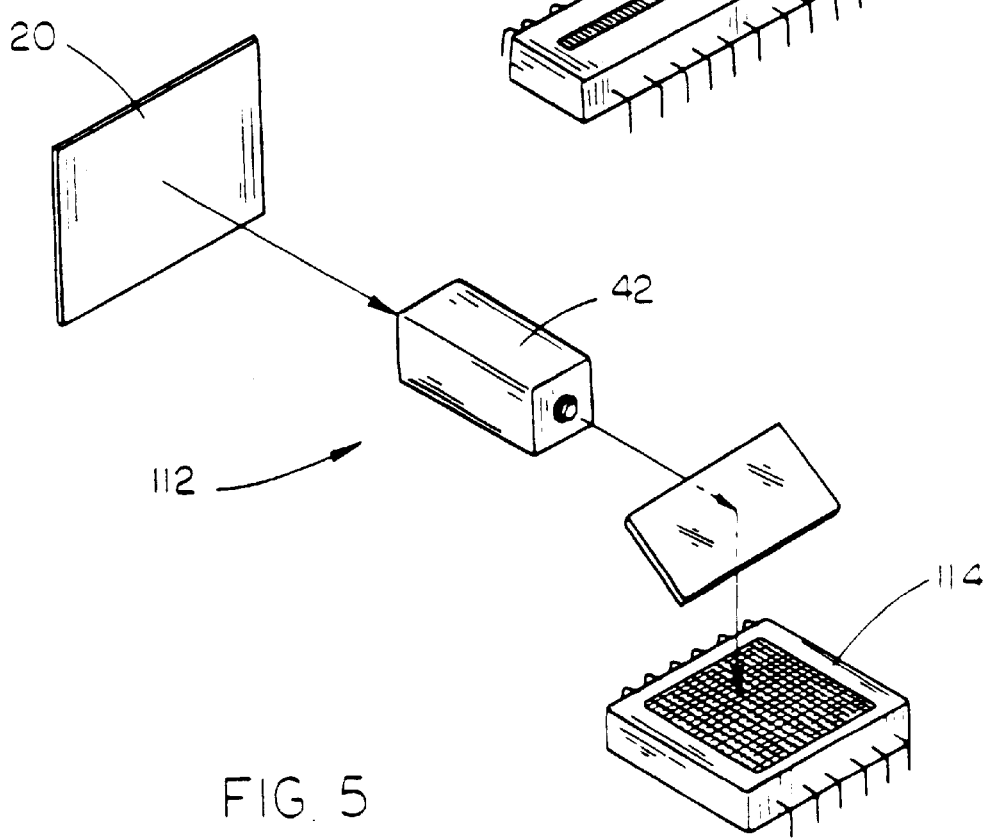
FIG. 5 is a highly diagrammatic perspective view of the image capturing elements of a two-dimensional array exemplary embodiment of the present invention.

In particular, in a first exemplary embodiment 10 the image capture means 12 utilizes a one-dimensional photosensitive array 14 to read images in a horizontal (X) direction and mechanical means 16 to read images in a vertical direction. Conversely, in a second exemplary embodiment 100 the image capture means 112 utilizes a two-dimensional photosensitive array 114 to read images in horizontal (X) and vertical (Y) directions (FIG. 5).

Figure 4:
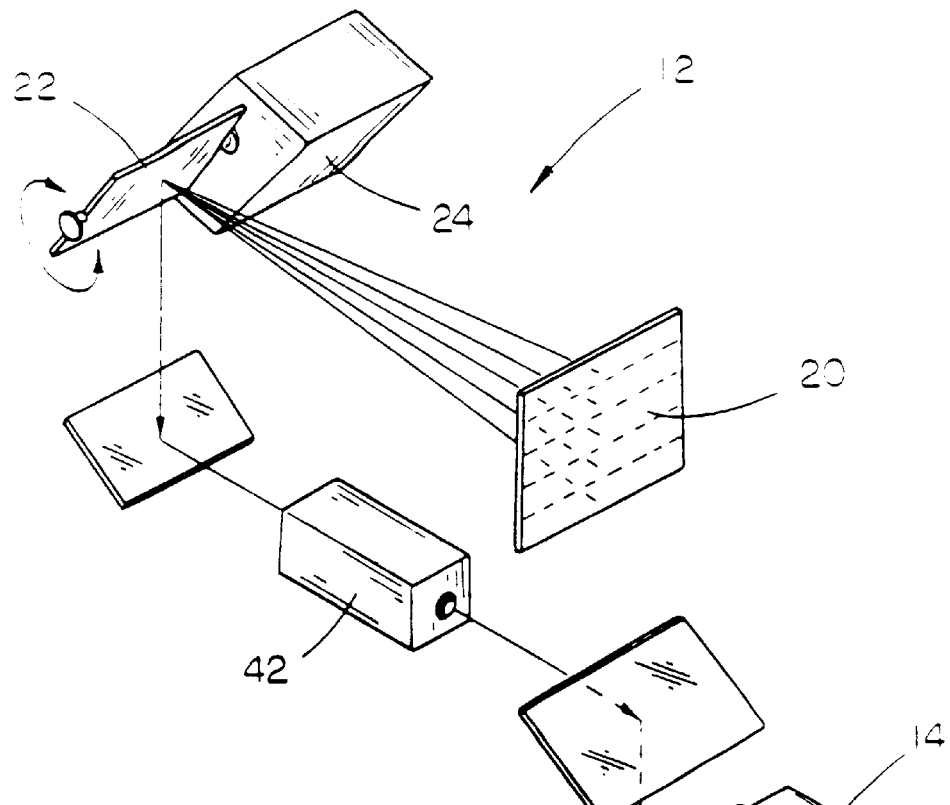
FIG. 4 is a highly diagrammatic perspective view of the image capturing elements of a linear array exemplary embodiment of the present invention.

Turning to the first exemplary embodiment 10, having image capture means 12, best illustrated in FIG. 4, vertical components 16 of a two-dimensional bar code symbol 20 are read by rastering succeeding horizontal components 18 across a single line photosensitive array 14. This is accomplished, in such an exemplary embodiment, via a mirror 22 rotatably mounted about its horizontal plane. The mirror 22 is rotatably connected and driven by mirror control means 24. In a preferred exemplary embodiment an extremely low mass mirror prism (22) may be utilized and driven by solenoids, a piezo, or the like (24).

In this embodiment 10, an expanded 5,000 pixel single line photosensitive array 14 may be utilized. However, a 2,048 pixel one-dimensional line photosensitive array would also work with a reduced range. A special photosensitive array might also be designed with faster scan line times and reduced power requirements.

Figure 6:
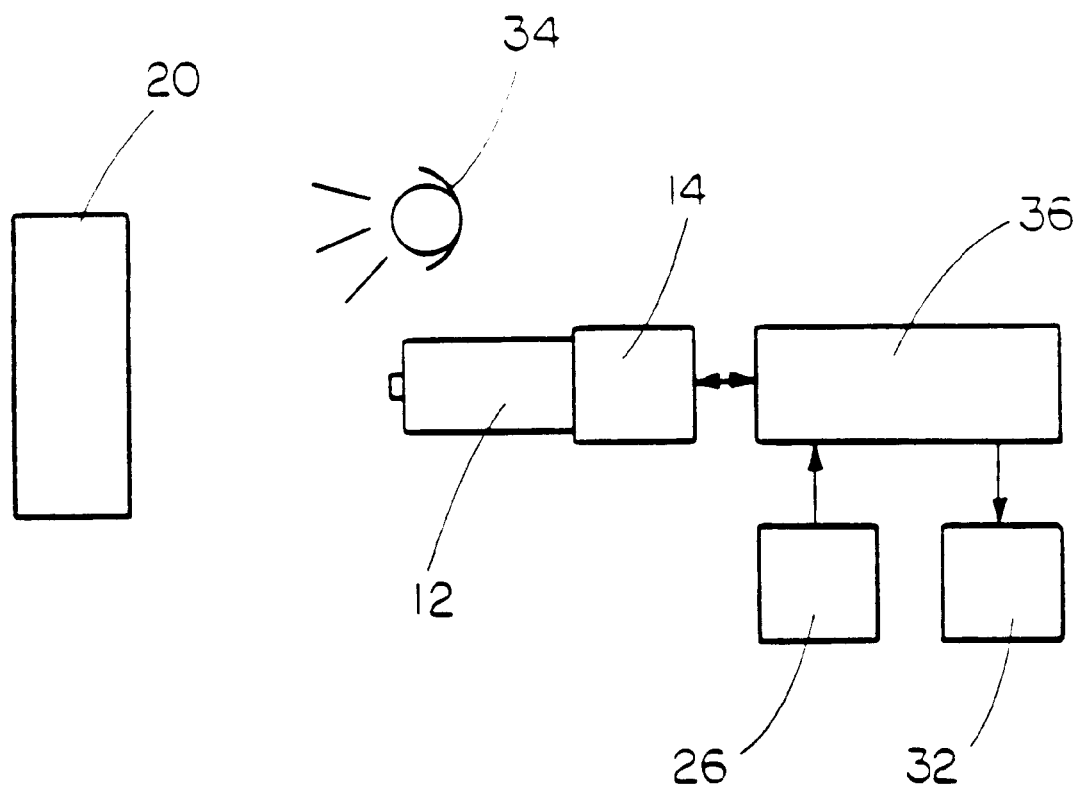
FIG. 6 is a block diagram illustrating the various components of the present invention.

Vertical raster (Y) is variable under microprocessor 26 control (FIG. 6). Likewise, the readout speed of the photosensitive array 14 is variable under microprocessor 26 control wherein the readout is preferably based on analyzed data recovered on each scan. Likewise, integration time and gain of sense amplifiers and filters acting on the photosensitive array 14 data may also be variable under microprocessor 26 control.

Additionally, an electronic option to read lower density bar code symbols could also be incorporated wherein every other, every third, or every fifth pixel might be read. Likewise, an electronic option to read high density short strings might also be incorporated wherein the left 1666, then center 1666, and then right 1666 pixels are read.

In another exemplary species of this embodiment 10 the photosensitive array shift register drives are built into the array. Electronic control of each charge well might also be provided such that wells not in use would not exist to the microprocessor 26. Such a configuration prevents dark currents from filling empty wells. Additionally, wells might also be created by the microprocessor 26 just prior to use. Thus, no special cleaning cycles will be necessary.

In another exemplary species of this embodiment 10 the interface could be more parallel wherein multiple photosensitive array 14 shift sections could each shift out their own output, for example, five outputs (each shifting 1000 pixels), or ten at 500 pixels, etc. Such a design would also utilize square pixel dimensions in order to maintain equal vertical and horizontal density.

The image capture means 12 may also include autofocus means. Autofocus could be accomplished via infrared or ultrasonic independent means, or via the use of photosensitive array scans in order to maximize transition sharpness of the received image, or the like. Likewise, the image capture means 12 would also include zoom controlled by the user.

Aiming of the reader 10 would be accomplished by physical proximity for close range (contact to two inches). The use of spotter beams is not desired because of their additional cost and tendency to washout in lighted areas. Aiming of the reader 10 for long range would be accomplished via a display 28 (<1 to 20 plus feet). The display 28, in a preferred exemplary embodiment 10, would be a one inch CAT, dedicated LCD graphics screen, or even a terminal screen on an integrated scanner.

Figure 1:
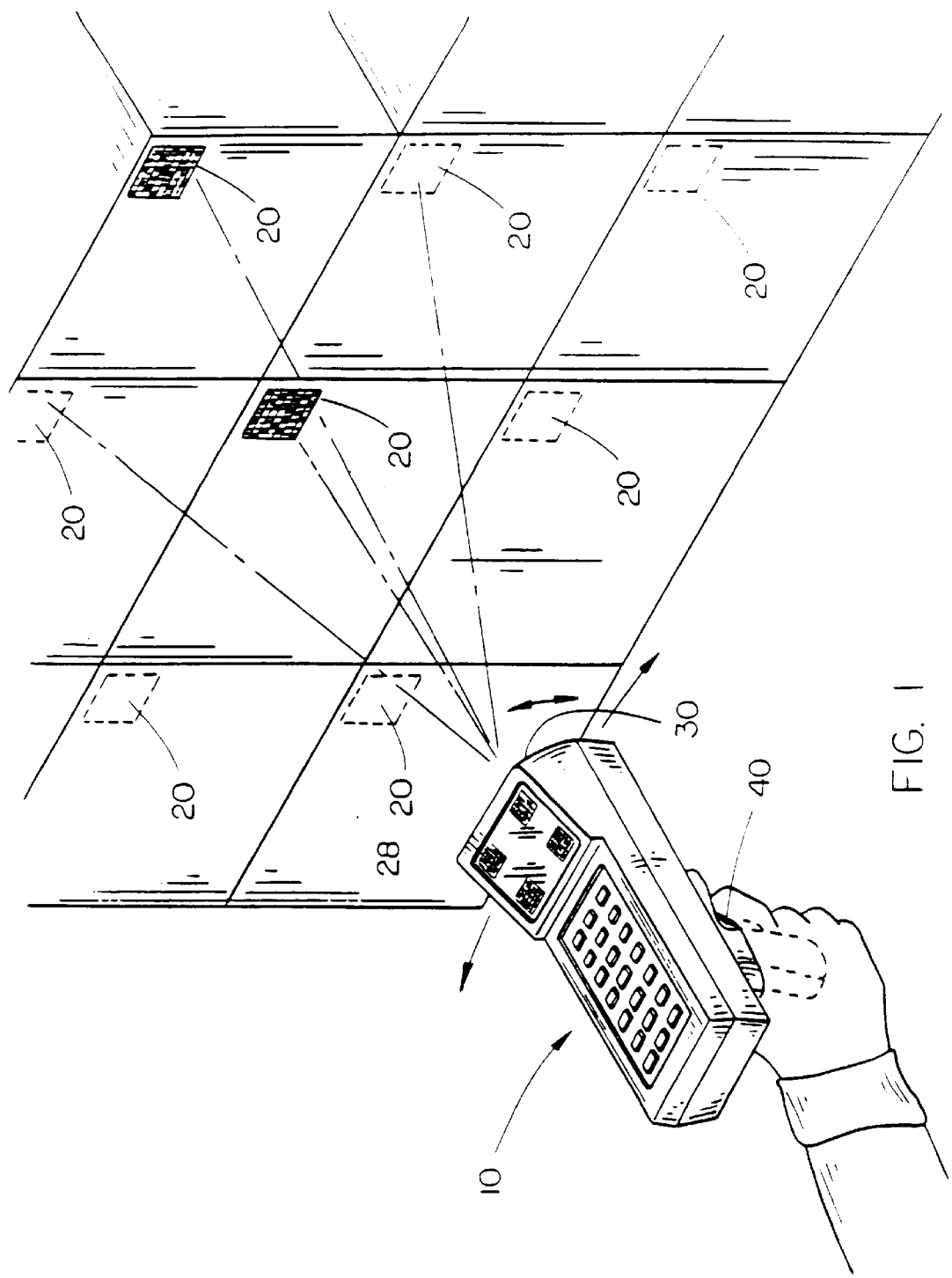
FIG. 1 is a perspective view of a preferred embodiment of the two-dimensional optical information reader showing a user being assisted by the display of the reader in aiming.
Figure 2:
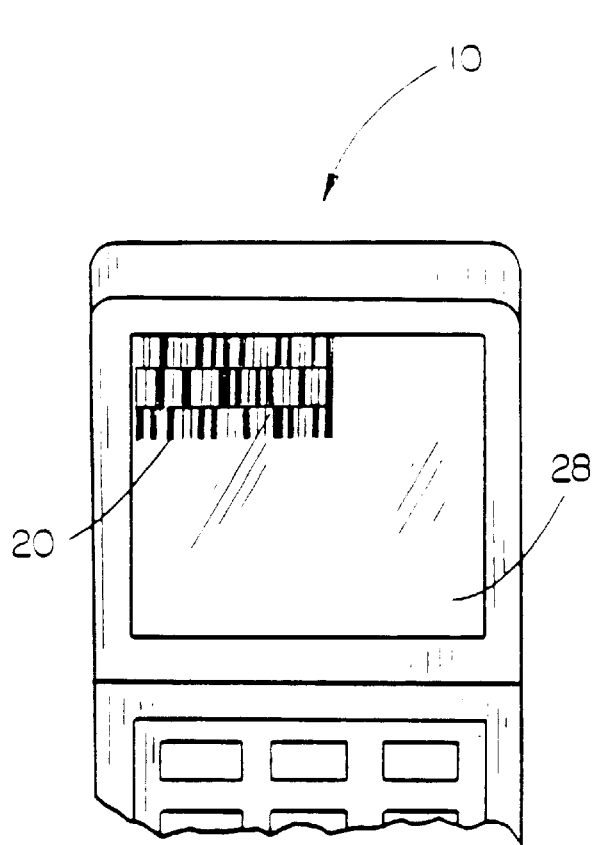
FIG. 2 is a partial top perspective view of the reader illustrating the display wherein the display indicates to a user that a two-dimensional, decodable, bar code symbol may be read if the user adjusts the aim of the reader to the left and above.
Figure 3:
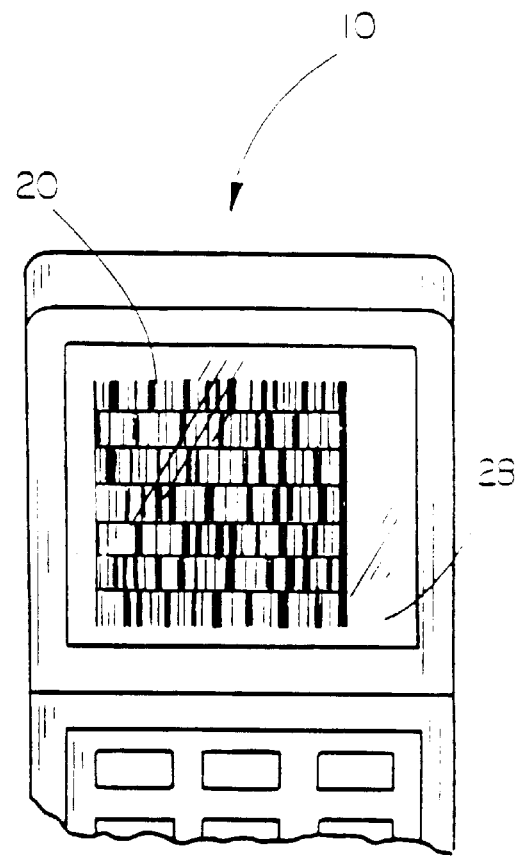
FIG. 3 is a partial top perspective view of the reader illustrating the display wherein the display indicates to a user that a two-dimensional, decodable bar code symbol is centered in view and available for reading.

In such an embodiment 10 low resolution scanning may be performed while aiming. Image processing techniques would then be utilized to display lines and shadows with sufficient aiming detail (FIGS. 1, 2, and 3). The microprocessor 26 would then utilize pattern recognition techniques to locate rectangular shapes (or other information encoded shapes). Where the microprocessor 26 locates rectangular shapes (or other information encoded shapes) which might be decodable bar code symbols, the closest such shape to the center of the reader 10 window 30 would then be displayed on the display 28 in a highlighted manner, e.g., flashing, reverse video, or the like. During this same time period the microprocessor 26 may also make an attempt to decode the contents within the highlighted area. Then, if the decode attempt is successful, the highlighted area could return to normal, or the like, in order to notify the user that the decode was successful and that the user may either accept or reject the data. If the data is from the wrong bar code symbol, or the wrong portion of a correct bar code symbol, then the user may aim at a new area without accepting the data.

The use of zoom during aim induces jitter, therefore, in order to overcome this problem, more data may be scanned than is viewed on the display 28. If 1,000 pixels are collected but only 700 are viewed on the display 28, then the microprocessor 26 may compare general patterns of each scan to detect motion and adjust the data sent to the display 28 to compensate for the motion. Additionally, as the displayed portion of the collected pixel picture reaches a boundary of the pixel picture, then the displayed picture would start to move such that the center of the collected data is then shown as the displayed picture. In another species of an exemplary embodiment 10 all rectangular areas within the displayed area may be highlighted to indicate to a user which areas are probable bar codes, and may annunciate that bar code symbol, or portion thereof, which the microprocessor 26 is currently attempting to decode.

Illumination might come from an internal source, LED's or such, where the light 34 would be on continuously during the aiming and decoding. The light 34 would be variable under processor control in order to reduce power consumption. Additionally, local illumination would only be necessary over a nominal distance. Beyond this, ambient light would contribute more and more of the actual bar code illumination. While indoors, flood lighting or indoor overhead lights would be necessary. The intention of this design is such that if the user can see the bar code, the reader 10 will also, and decoding is possible.

Neural network and fuzzy logic processor programming and hardware design/architecture are both required. Digital signal processing techniques may also be used to help improve the basic data collected as far as signal level normalization within the bar code rectangular areas, taking advantage of bar codes still being printed in 2 colors only. Neural network concepts of weighted inputs and highly parallel processing would then be used during aiming and during a search for potential bar code 20 rectangles.

The use of concise dedicated functional neural processor, each with a single function, all reduced to silicon and all placed in a single ASIC is preferred. In this manner, 20 microprocessors, wherein one looks for a vertical line, another for a horizontal line, and another for angles, and the like, could all examine the same data base at the same time. Very high speed data (image) evaluation will also be utilized in a preferred embodiment for both aiming and decoding. The same microprocessors could also be responsible for power control in the image capture means 12. Additionally, it is preferred that not all processing functions be powered at all times or at the same time. Also, illumination would end and count (data) collection would cease after data was decoded. A communication processor could also be provided and such communication processor could be functional until data was transferred.

A typical operation might be as follows: The user directs the reader 10 toward the bar codes 20 to be read (FIG. 1). The user pulls a trigger means 40 to activate the aiming sequence. The user views the display 28 to verify reader 10 aim. The reader 10 auto focuses, starting with the focus setting of the previous read. The user views the display 28 and moves the reader 10 and starts to zoom as necessary as the desired bar code symbol 20 comes into view (FIG. 2). The reader 10 continues to show the viewed field in the display 10 even as it decodes the bar code symbol 20. The reader 10 highlights the decoded bar code symbol 20 (FIG. 3). The user may accept the decoded data via the trigger means 40, or the like. If the user does not want the data, he or she may move the reader 10 such that another desired bar code symbol 20 is centered and highlighted as decoded, or such that no bar code is highlighted and no decode would occur.

This feature is very beneficial in that one bar code can be selected on a page containing many adjacent codes without the sometimes impossible requirement of ensuring the scan line (laser) goes through only the desired code.

Figure 7:
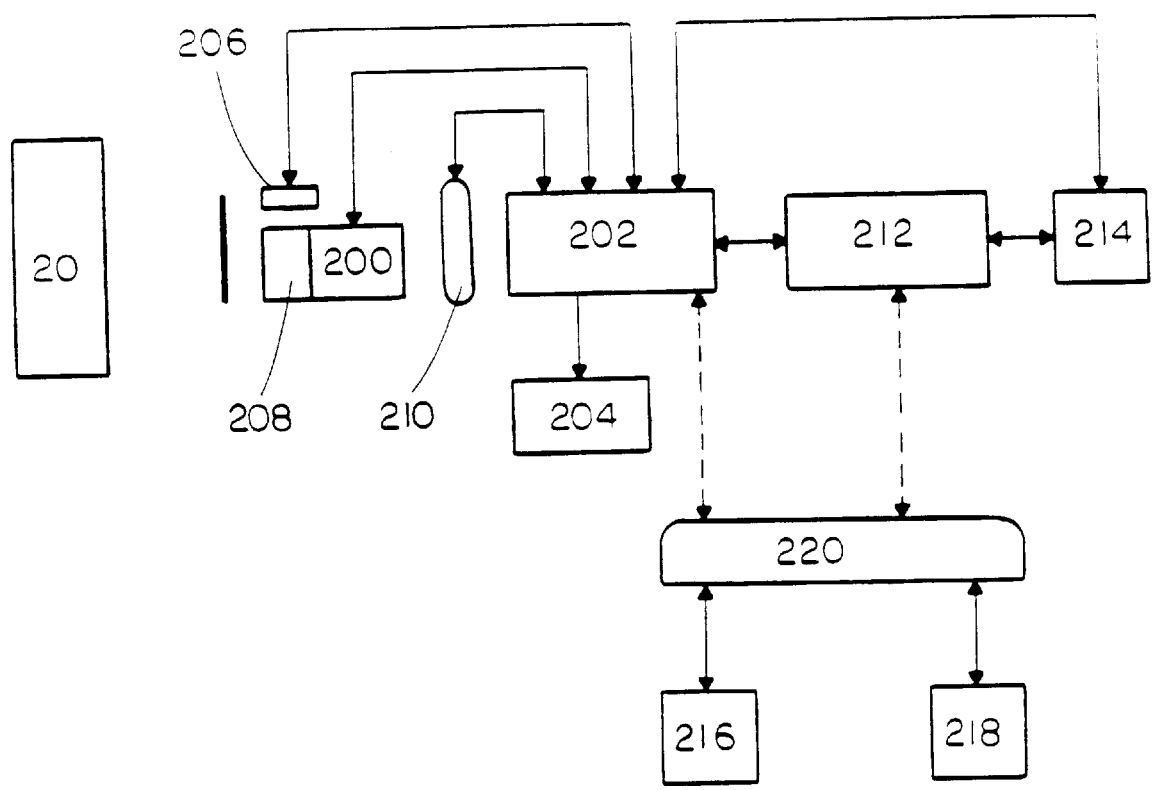
FIG. 7 is a more detailed block diagram illustrating the various components of the present invention.

FIG. 7 is a block diagram illustrating the functional block organization of an exemplary two-dimensional bar code reader of according to the present invention. The optic string 200 allows for image focus and zoom. Both focus and zoom management are provided by the control processor 202. The input switches 204, such as the trigger 40, may be utilized to enable the scan function, or the like. While in the scan mode, focusing may be achieved according to at least two methods. As shown, there is a focus block function 206 which may utilize a separate range detection circuit (i.e., such as ultra-sonic or infra-red ranging means). This is the first type of focusing method. This method allows the control processor 202 to determine the range of an image from the scanner and move the lens assembly 208 accordingly without powering up, or at least without operating the image sensor 210 circuitry, data analyzing means 212, and display 214. In this fashion battery power is conserved. The second type of focusing method utilizes the image sensor 210/processing means 212 to detect a lack of focus by data frequency analysis, i.e., moving the lens assembly 208 in order to maximize the high frequency content of the image data. The second type of focusing requires fewer parts, but more power and the initial corrective movement may be in an incorrect direction. Using past direction history will improve chances of correct initial direction choice. Also any optically required focus adjustments due to zoom changes may be obtained from a look-up table within the control means and included in the control of focus during zoom changes.

The image sensor may be either a single line several thousand pixel sensor (from at least 1000 to 5000 pixels depending on scan requirements) or an array sensor with from at least 500 to 1500 pixels in both the X and Y axis. The preferred mode is to utilize an array sensor since it is both faster and requires fewer moving parts. However, cost and power requirements are greater with an array sensor.

As previously discussed, a one dimensional array requires motion in the orthogonal direction to the pixel layout in order to obtain a 2-D image. The pixels in both sensors are square in dimension in order to maintain relative dimensions in both X and Y directions. One method of providing vertical dithering (back and forth) is via a piezo element driven mirror within a folded optic path. However, a rotating polygon cylinder may also be utilized.

In order to reduce power and gain speed in honing in on an image, both image sensor methods allow partial reading of the sensor fields. This means that during a line scan of a one line sensor, a programmably controlled number of pixels are skipped within the sensor on a cyclic basis in order to obtain less dense scan information more rapidly. For instance, reading only every other, every third, or every fifth pixel means less taken to process the data. A less detailed image is acquired, but speed, not great detail is required for general aiming and setup. In the vertical direction, the mirror is moved further between samples to compensate for the partial pixel sample and in order to keep spatial relationships constant. With a two-dimensional array, the same partial pixel viewing is done in both directions at the same rate. Both sensor types allow controlled exposure time independent of cycle time.

The control processor means contains at least one microprocessor. The control processor is responsible for controlling focus, zoom, illumination (if necessary), sensor timing, power management, and communication to other system blocks. The control processor utilizes fuzzy logic decision structures to quickly focus and to analyze the overall image pattern. It is also responsible for controlling the sensor when retrieving high density pixel strings from portions of the sensor. This is useful when a low density pixel scan has enabled the processing function means to recognize a potentially decodable shape. A maximum density scan is then done over that portion of the sensor to try to determine if decode is possible. These high density scan portions might consist of the left, center, and right sections of the sensor. this may also be accomplished by programming start and stop points within the sensor to control which section is retrieved.

Under zoom conditions, user movement will be more apparent and objectionable. The processing function means controls the image sent to the display for assisting the user in aiming the scanner unit. The processing function means helps remove jitter caused by user motion by modifying the image sent to the display. The image sent to the display is a smaller portion of the actual scanned image. Fuzzy logic structures are again used to quickly determine patterns and shapes and track their movement. The smaller (or subset) image that is displayed remains, positioned as is, in the display until the displayed image bumps up against a border of the true collected image. Then the display image starts to move to the rate of user movement. The processor means is continually working to reduce jitter while also trying to recognize and decode potentially decodable images. It also enunciates potentially decodable images in the display, for instance surrounding an image with a solid outline, and marks fully decoded images in another manner, such as reverse video.

Communication control means 220 communicates with the control and processing means to provide interface to a host system. The communication control means 220 may also have its own microprocessor for handling protocol and data transfer. Further detail regarding the communication control means 220 can be found in reference to FIGS. 10*a* and 10*b* below.

Figure 8:
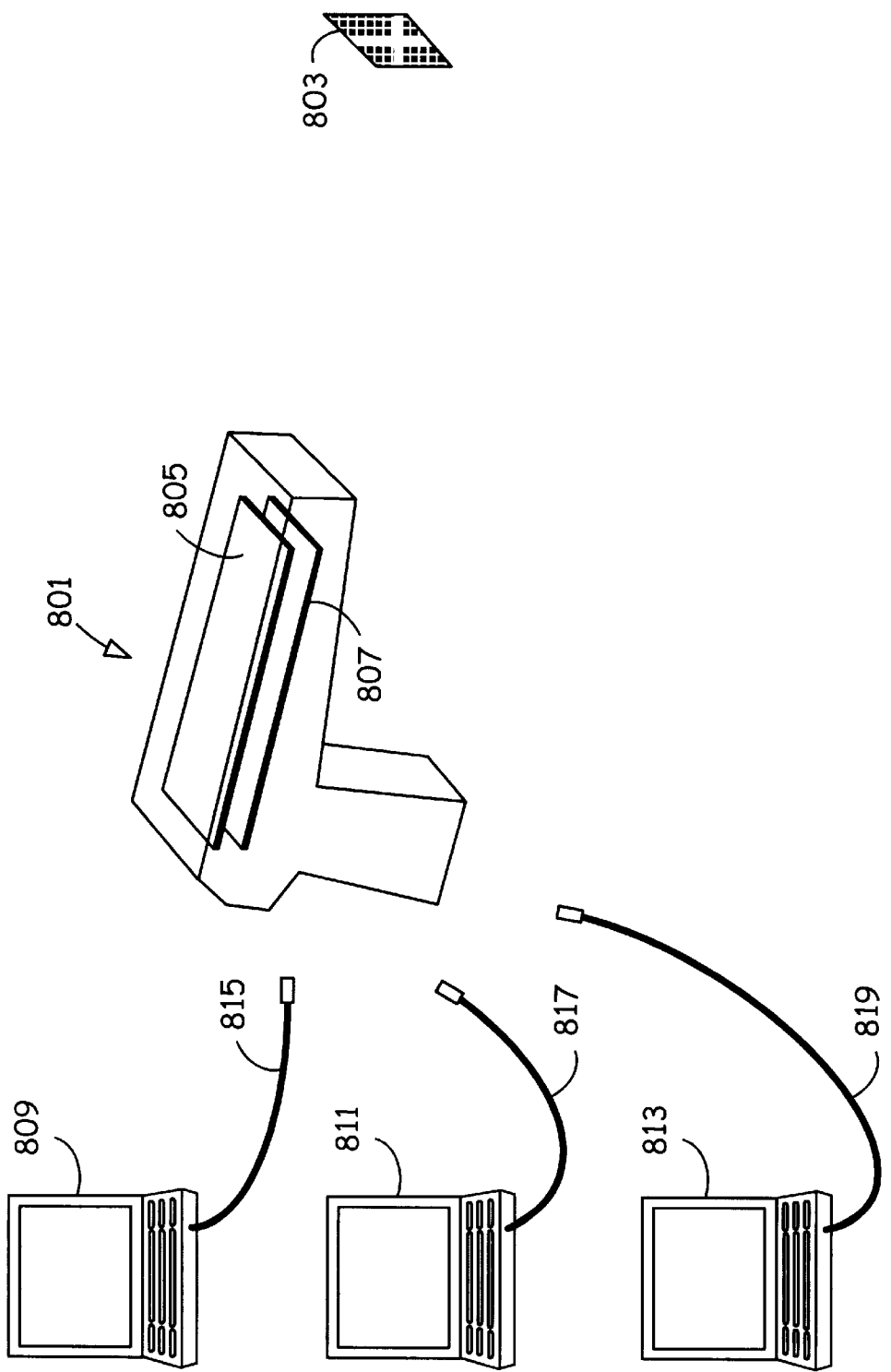
FIG. 8 illustrates an embodiment of the present invention wherein two-dimensional code information is converted where necessary into either a decoded or undecoded one-dimensional code format.

FIG. 8 illustrates an embodiment of the present invention wherein two-dimensional code information is converted where necessary into either a decoded or undecoded one-dimensional code format. Specifically, a code reader 801 is shown which receives reflected light from two-dimensional code information such as that shown on a two-dimensional code 803. Boards 805 and 807 located within the code reader 801 contain an optics assembly, sensor, and processing circuitry operable for reading and decoding the information represented by the received reflected light. The components on boards 805 and 807 may also, of course, be on a single board.

The code reader 801 may be used in conjunction with any of the terminals 809, 811, or 813. The terminal 809, for example, represents one which can only read a wand-type data stream, while the terminals 811 and 813 represent ones which can only read one-dimensional decoded data and one-dimensional undecoded data (such as is generated by a wand), respectively.

In one embodiment, the code reader 801 can be appropriately configured using a keyboard and display, such as that illustrated in FIG. 1. Specifically, the keyboard and display can be used to program the code reader 801 to utilize the appropriate communication protocol needed to communicate with the attached terminal.

In an alternate embodiment, the code reader 801 contains autodetect circuitry (described in more detail below) which identifies which type of terminal is attached. For example, the code reader 801 may be configured with three connectors for receiving three cables 815, 817 and 819 so as to permit communication with the terminals 809, 811 and 813. In this embodiment, the autodetect circuitry need only determine which connector is in use. Further detail regarding such autodetection of this embodiment can be found below in reference to FIG. 10*b*.

In yet another embodiment, detailed below in reference to FIG. 10*a*, the code reader 801 can be configured with a single connector and autodetect circuitry capable of identifying the attached terminal type by evaluating the signal lines from the cables. Further detail for such evaluation can be found in reference to FIG. 10*b* below.

Figure 9:
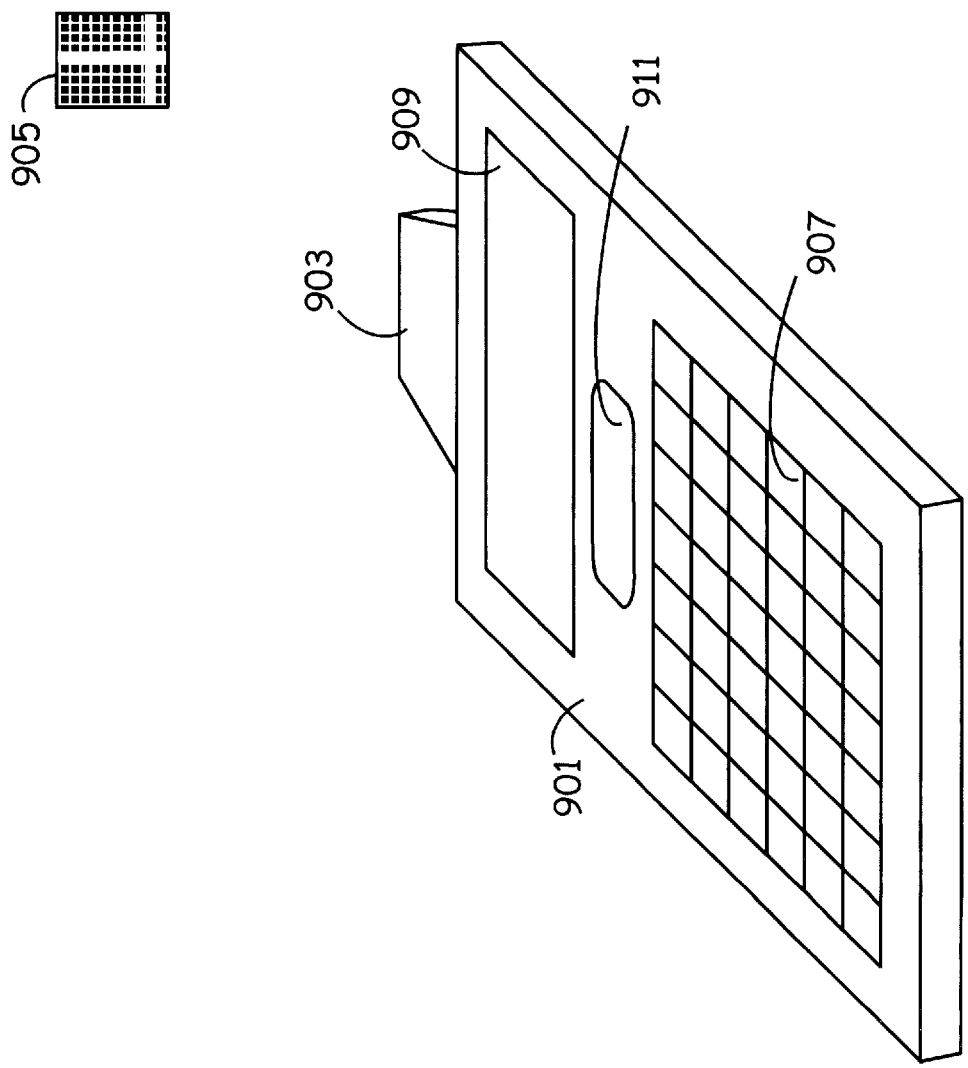
FIG. 9 illustrates an embodiment of the present invention wherein the optics and code reading circuitry are attached to a hand held data capture terminal in an alternate configuration.

FIG. 9 illustrates an embodiment of the present invention wherein the optics and code reading circuitry are attached to a hand held data capture terminal in an alternate configuration. Specifically, a portable data collection terminal 901, like any of the terminals illustrated in FIG. 8, can be of any type, i.e., may only be capable of receiving one dimensional code information for example. A code reader 903 operates identically to that discussed in the previous Figures by reading and decoding two-dimensional bar codes such as a bar code 905, and converting the two-dimensional code information into an appropriate one-dimensional format if necessary. However, the code reader 903 is of a modular construction which may be inserted directly into a receiving slot in the terminal 901 or may attach to a connector located on the top of the terminal 901. Such a communication interconnection would functionally operate, from an electrical standpoint, identically to that of a cabling interconnect as shown in FIG. 8. The terminal 901 is also configured with a keypad 907, a display 909 and a pen input 911.

Figure 10A:
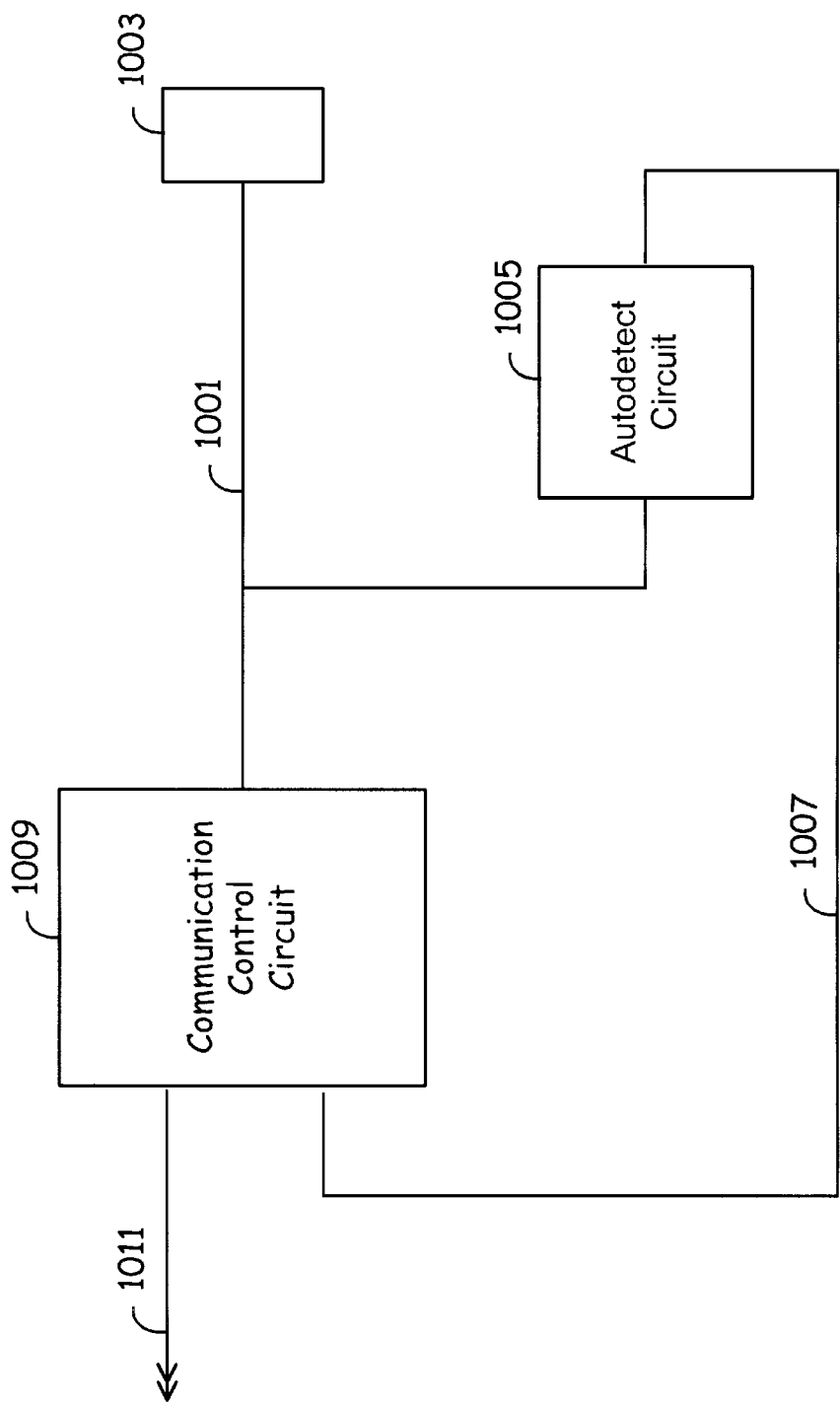
FIGS. 10a and 10b illustrate three embodiments of the autodetection functionality of the present invention.
Figure 10B:
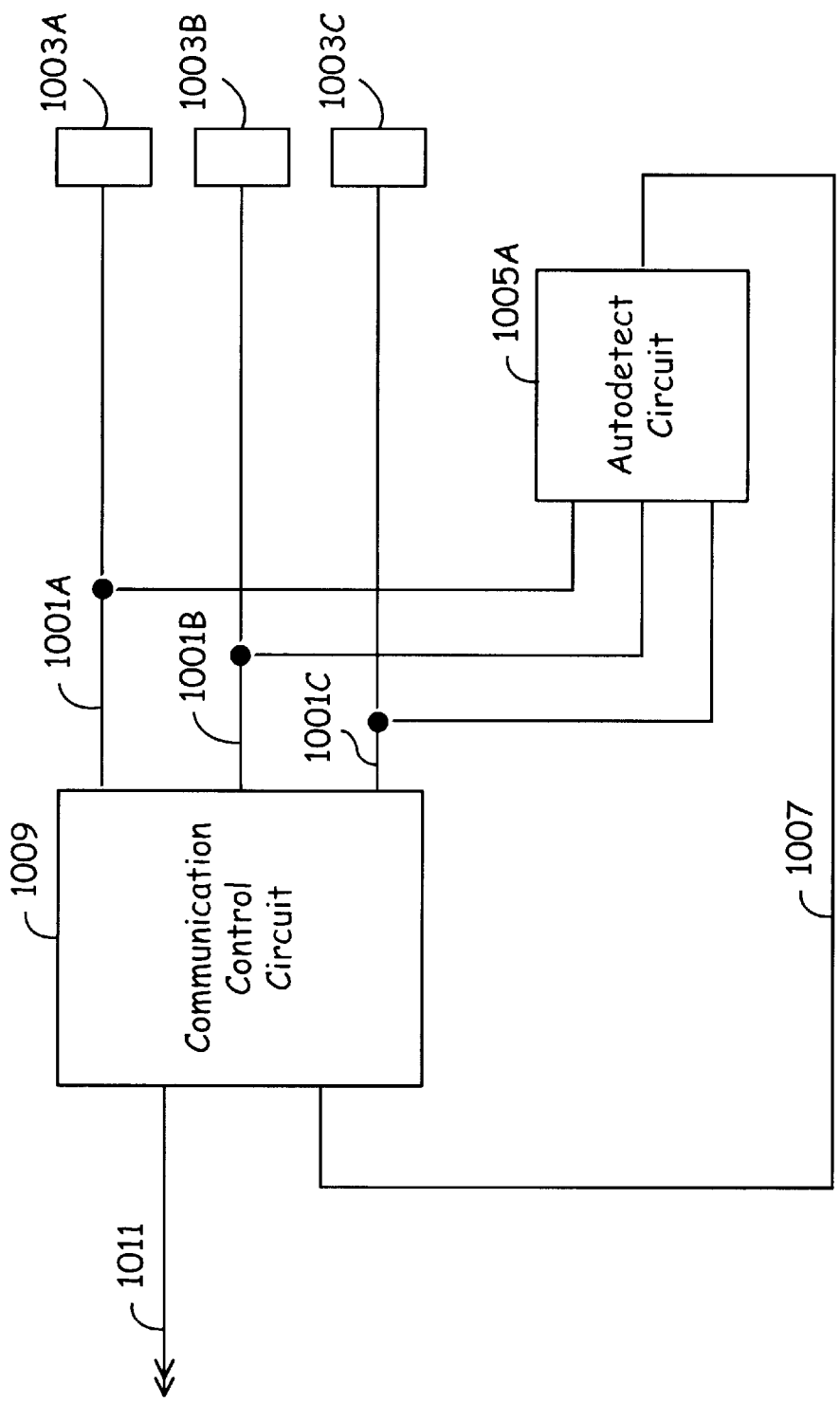

FIGS. 10*a* and 10*b* illustrate three embodiments of the autodetection functionality of the present invention. FIG. 10*a* illustrates three embodiments of the autodetection circuitry necessary to identify whether an attached terminal can read two-dimensional codes or only one-dimensional codes which are either decoded or undecoded. Specifically, in FIG. 10*a*, a terminal of any of the variety of types is connected to a communication bus 1001 via a connector 1003. Specific lines in the communication bus 1001 are monitored by an autodetect circuit 1005. If no terminal is detected by the autodetect circuit 1005, the autodetect circuit 1005 via a control bus 1007 causes a communication control circuit to disable communication output on the communication bus 1001. However, upon detecting and identifying the type of terminal connected, the autodetect circuit 1005 provides an indication to the communication control circuit 1009 of the terminal type via the control bus 1007. The communication control circuit 1009 responds by converting the two-dimensional code information, if necessary, to a one-dimensional form, and provides appropriate output signals along the control bus 1001 to communicate with the terminal attached to the connector 1003.

More particularly, the autodetect circuit 1005 identifies which lines of the communication bus 1001 appear to be (i)

grounded, (ii) tied to a positive power source, and (iii) toggling between states. From this information, the autodetect circuit 1005, using simple conventional logic, automatically determines which type of terminal is connected. Moreover, the connectors from the terminals may be modified to aid this type of autodetect process.

In a second embodiment, instead of analyzing the states of the incoming lines of the communication bus 1001, the autodetect circuit 1005 instead attempts to establish communication to any attached terminal by first setting up the communication control circuit 1009 to assume the attached terminal can read two-dimensional code information. Thereafter, the autodetect circuit 1005 monitors the results of an attempted communication. If the communication attempt fails, the autodetect circuit 1005 makes a second assumption that decoded, one-dimensional code information can be sent, and sets up the communication control circuit 1009 via the control bus 1007 accordingly. Again, if this communication attempt fails, the autodetect circuit 1005 configures the communication control circuit 1009 to communicate using undecoded, one-dimensional code information (e.g., wand type signal streams).

In a third embodiment, characteristics of the previous two embodiments are combined so that the autodetect circuit 1005 evaluates the logic states of the lines of the communication bus 1001 to make initial determinations which are incomplete, but then utilizes the communication failure procedure to make a final selection.

FIG. 10b illustrates yet another embodiment of the autodetect circuit of the present invention. As shown, instead of one connector, the present embodiment utilizes three separate connectors, connectors 1003A, 1003B and 1003C. Each connector corresponds to one type of connector. For example, the connector 1003A only connects to a wand type terminal, while the connector 1003B only connects to a terminal which can receive decoded one-dimensional codes, and so on. In this situation, the autodetect circuit 1005A, by sensing the signal states of the lines of communication buses 1001A, 1001B and 1001C determines which terminal is attached. In response, the autodetect circuit 1005A communicates the identity of the type of terminal attached to the communication control circuit 1009 via the control bus 1007. The communication control circuit 1009 thereafter selects the appropriate communication bus and determines whether a two-dimensional code conversion is necessary. If the conversion is necessary, the communication control circuit 1009 converts the code into the corresponding counterpart data signals for transmission to the attached terminal via the appropriate communication bus.

Additionally, although autodetection among three types of terminals is disclosed, it would be clear to those of ordinary skill in the art that additional terminal types could also be automatically detected, and other corresponding appropriate conversion and communication configurations could be added.

Thus, there has been shown and described an improved two-dimensional optical information reader which accomplishes at least the stated objects. While the invention has been described with a certain degree of particularity, it is manifest that many changes may be made in the details of construction and the arrangement of components without departing from the spirit and scope of the disclosure. It is understood that the invention is not limited to the embodiments set forth herein for purposes of exemplification, but is to be limited only by the scope of the appended claims including the full range of equivalency to which each element thereof is entitled.

I claim:

1. A code reading system for converting two-dimensional code information into a format useable by any of a plurality of types of terminals, wherein at least one of the plurality of types of terminals accepts two-dimensional code information and at least one of the plurality of types of terminals accepts only one-dimensional code information, said two-dimensional code reading system comprising:

a code reader unit;

a light source in the code reader unit that directs light toward two-dimensional code information to be read;

a sensor in the code reader unit that detects light reflected from the two-dimensional code information;

processing circuitry in the code reader unit for decoding the two-dimensional code information represented by the reflected light detected by said sensor;

an autodetect circuit that identifies whether said code reader unit is communicatively coupled to a terminal and determines whether a communicatively coupled terminal accepts two-dimensional code information;

said autodetect circuit also identifies an appropriate protocol for communicating with a communicatively coupled terminal; and communication control circuit responsive to the autodetect circuit by selectively converting at least part of the two-dimensional decoded information into a one-dimensional format for communication to any communicatively coupled terminal that cannot process two-dimensional code information.

2. The code reading system of claim 1 further comprising:

a wired link having a plurality of signal lines which coordinate to communicatively couple said code reading unit with a terminal; and said autodetect circuit determines whether a communicatively coupled terminal accepts two-dimensional code information by evaluating the plurality of signal lines of said wired link.

3. The code reading system of claim 1 wherein said autodetect circuit determines whether a communicatively coupled terminal accepts two-dimensional code information by attempting delivery of two-dimensional code information.

4. The code reading system of claim 1 wherein said communication control circuit selectively converts the two-dimensional code information into an undecoded one-dimensional format.

5. A code reading network for reading and processing two-dimensional code information, said network comprising:

a code reader unit generating two-dimensional code information via an illumination, detection and decoding process;

a terminal selected from among a plurality of types of terminals, wherein at least one of the plurality of types of terminals accepts two-dimensional code information and at least one of the plurality of types of terminals only accepts one-dimensional code information;

a communication link communicatively coupling said code reader unit and said terminal; and said code reader unit converts at least part of the two-dimensional code information into a format that said terminal can accept if two-dimensional code information is not acceptable.

6. The code reading network of claim 5 wherein said code reader unit converts the two-dimensional code information into an undecoded one-dimensional format.

7. The code reading network of claim 5 wherein said code reader unit converts the two-dimensional code information into a decoded one-dimensional format.

8. The code reading network of claim 5 wherein:

said communication link comprising a wired link having a plurality of signal lines which coordinate to communicatively couple said code reading unit with said terminal; and said code reading unit identifies characteristics of said terminal by evaluating the plurality of signal lines of the wired link.

9. The code reading network of claim 5 wherein said code reading unit determines whether said terminal accepts two-dimensional code information by attempting delivery of two-dimensional code information via said communication link.

10. A code reading network for reading and processing two-dimensional code information, said network comprising:

a code reader unit generating two-dimensional code information via a code reading process;

a terminal selected from among a plurality of types of terminals, wherein at least one of the plurality of types of terminals accepts two-dimensional code information, and at least one of the plurality of types of terminals accepts only one-dimensional code information;

a communication link communicatively coupling said code reader unit and said terminal; and said code reader unit selectively manipulates the two-dimensional code information based on the one of the plurality of types of terminals selected to enable delivery via said communication link to said terminal.

11. The code reading network of claim 10 wherein:

said communication link comprises a wired link having a plurality of signal lines which coordinate to communicatively couple said code reading unit with said terminal; and said code reading unit identifies characteristics of said terminal by evaluating the plurality of signal lines of the wired link.

12. The code reading network of claim 11 wherein said code reading unit determines whether said one of the plurality of terminal accepts two-dimensional code information by attempting delivery of two-dimensional code information.

13. In a code processing network having a terminal that processes code information in a one dimensional format yet cannot process code information in a two dimensional format, a code reader unit that captures two dimensional code images, the code reader unit comprising:

an interface that supports communication to the terminal;

processor that performs decoding of captured two-dimensional code images to extract code information in a two dimensional format; and the processor converts the extracted code information from the two dimensional format into a one dimensional format for receipt and processing by the terminal.

14. The code reader unit of claim 13 wherein the one dimensional format constitutes an undecoded, one-dimensional format.

15. The code reader unit of claim 13 wherein the one dimensional format constitutes a decoded, one dimensional format.

16. The code reader unit of claim 13 wherein the processor selectively converts the code information from the two dimensional format to the one dimensional format based on the determination by the processor that the terminal cannot accept the two dimensional format.

17. The code reader unit of claim 16 wherein the processor automatically determines the format capabilities of the terminal when communicatively coupled to the terminal via the interface.

* * * * *